(12) United States Patent
Park et al.

(10) Patent No.: US 7,372,893 B2
(45) Date of Patent: May 13, 2008

(54) DEVICE AND METHOD FOR COMPENSATING FOR PHASE DISTORTION IN BASE STATION OF OFDMA-BASED CELLULAR SYSTEM

(75) Inventors: Youn-Ok Park, Daejeon (KR); Young-Hoon Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 651 days.

(21) Appl. No.: 10/691,084

(22) Filed: Oct. 21, 2003

(65) Prior Publication Data

US 2004/0248527 A1 Dec. 9, 2004

(30) Foreign Application Priority Data

May 23, 2003 (KR) .................. 10-2003-0032932

(51) Int. Cl.
*H04B 1/00* (2006.01)
(52) U.S. Cl. .............. 375/147; 370/319; 370/335; 370/337; 370/344; 370/347; 370/441; 370/442; 370/445; 375/148; 375/260; 375/349
(58) Field of Classification Search .......... 455/118; 375/349, 148; 342/375; 370/208, 260, 481
See application file for complete search history.

(56) References Cited

U.S. PATENT DOCUMENTS

| 5,646,632 | A * | 7/1997 | Khan et al. ............. 342/375 |
| 6,628,673 | B1 * | 9/2003 | McFarland et al. ....... 370/481 |
| 2002/0097669 | A1 * | 7/2002 | Kim ........................ 370/208 |
| 2003/0063558 | A1 * | 4/2003 | Kim ........................ 370/208 |
| 2004/0076239 | A1 * | 4/2004 | Yu et al. .................. 375/260 |

FOREIGN PATENT DOCUMENTS

WO WO 01/50674 A1 7/2001

OTHER PUBLICATIONS

Jan-Jaap Van De Beek, et al., "A Time and Frequency . . . for Multiuser OFDM"; IEEE Journal on Selected Areas in Communications, vol. 17, No. 11, Nov. 1999, pp. 1900-1914.
Andrea M. Tonello, et al., "On the Effect of Time and Frequency Offsets . . . Systems"; Proceedings of ICT 2000, Acapulco, May 22-25, 2000, pp. 614-618.
R. Nogueroles et al., "Improved Performance of a Random OFDMA Mobile Communication System", Vehicular Technology Conf., 1998, VTC 98, 48th IEEE vol. 3, May 18-21, 1998, pp. 2502-2506 vol. 3.

(Continued)

*Primary Examiner*—David C. Payne
*Assistant Examiner*—Adolf DSouza
(74) *Attorney, Agent, or Firm*—Blakely, Sokoloff, Taylor & Zafman

(57) ABSTRACT

Disclosed is a device and method for compensating for phase distortions in a base station of an OFDMA-based cellular system. The method comprises receiving OFDM symbols from a plurality of mobile stations, canceling a symbol guard interval using a reference timing signal, and performing an FFT (fast Fourier transform) process on the OFDM symbols; dividing the OFDM symbols that have undergone FFT processing into subchannel groups of the mobile stations; restoring phases of the OFDM symbols divided into subchannel groups; and performing channel estimation and equalization on the restored OFDM symbols for each mobile station to thereby perform a demodulation process.

8 Claims, 5 Drawing Sheets

OTHER PUBLICATIONS

Sari, H. et al., "An Analysis of Orthogonal Frequency-Division Multiple Access", 1997 IEEE, pp. 1635-1639.

Zou, H., et al., "An Integrated OFDM Receiver for High-Speed Mobile Data Communications", 2001 IEEE, pp. 3090-3094.

Speth, M., et al., "Frame synchronization of OFDM systems in frequency selective fading channels", 1997 IEEE, pp. 1807-1811.

Hazy, L., et al., "Synchronization of OFDM Systems Over Frequency Selective Fading Channels", 1997 IEEE, pp. 2094-2098.

P802.16a—Draft Amend to IEEE Std for Local & Metropolitan Area Networks, Part 16: Air Interface for Fixed Broadband Wireless Access Systems—Medium Access Control Modifications & Add'l Physical Layer Specs for 2-11 GHz, 2002 IEEE, pp. i-xxii, 1-309.

* cited by examiner

DEVICE AND METHOD FOR COMPENSATING FOR PHASE DISTORTION IN BASE STATION OF OFDMA-BASED CELLULAR SYSTEM

CROSS REFERENCE TO RELATED APPLICATION

This application claims priority to and the benefit of Korea Patent Application No. 2003-32932 filed on May 23, 2003 in the Korean Intellectual Property Office, the content of which is incorporated herein by reference.

BACKGROUND OF THE INVENTION (a) Field of the Invention

The present invention relates to a device and method for compensating for phase distortions in a base station of an OFDMA (orthogonal frequency division multiple access) based cellular system. More specifically, the present invention relates to a device and method for compensating for phase distortions in a base station of an OFDMA-based cellular system, in which the device and method allow multiple access in the uplink of the OFDMA-based cellular system.

(b) Description of the Related Art

Following developments in next-generation mobile communication systems, many methods have been proposed for providing various services including high-quality and high-speed multimedia services. However, the deterioration in performance caused by multipath fading channels in mobile communication environments has become serious impediments to realizing such services.

Therefore, many techniques for overcoming the deterioration in performance caused by multipath fading have been developed and used. A drawback of these techniques, however, is that although they minimize such performance deterioration, the techniques require the design of a complex receiver.

The OFDMA method has been suggested for easily solving the problem of deterioration in performance caused by multipath fading by using a simple demodulator.

In the OFDMA method, a total of N subcarriers are divided into groups in a single OFDM symbol and in such a manner that the subcarriers are not repeated, and one of the divided groups (or subchannels) is allocated to each mobile station user.

In the OFDMA method, each mobile station loads data to a subcarrier in the group and transmits the data during a predetermined time frame in the reverse link case. Since the subcarriers included in the subchannel allocated to users who stay in a single cell belong to a single OFDMA symbol, it is necessary for a base station receiver to perform synchronization between each of the subchannels received from the mobile station. That is, in order to perform accurate demodulation, it is necessary that the base station receiver perform the same FFT (fast Fourier transform) at the same symbol timing.

Hence, OFDMA flexibly processes various services for the multitude of requests made by users, but results in the deterioration of performance compared to other multi-user access methods when the multiple users are not synchronized in the uplink.

SUMMARY OF THE INVENTION

It is an advantage of the present invention to provide a device and method for compensating for phase distortions in a base station of an OFDMA-based cellular system, in which the device and method simply and stably demodulate data of mobile station users at a base station receiver without performing an additional synchronization process between the mobile station users in the reverse link.

In one aspect of the present invention, a method for compensating for phase distortions in a base station of an OFDMA-based cellular system comprises (a) receiving OFDM symbols from a plurality of mobile stations, canceling a symbol guard interval using a reference timing signal, and performing an FFT (fast Fourier transform) process on the OFDM symbols; (b) dividing the OFDM symbols that have undergone FFT processing into subchannel groups of the mobile stations; (c) restoring phases of the OFDM symbols divided into subchannel groups; and (d) performing channel estimation and equalization on the restored OFDM symbols for each mobile station to thereby perform a demodulation process.

In another aspect of the present invention, in a device for compensating for phase distortions of OFDM symbols received from a plurality of mobile stations in a base station of an OFDMA based cellular system, a phase distortion compensator in the base station of the OFDMA based cellular system comprises a symbol guard interval canceller for canceling a symbol guard interval of the OFDM symbols of the plurality of mobile stations received at the base station; an FFT (fast Fourier transform) processor for performing an FFT process on the OFDM symbols with the cancelled symbol guard interval; a subchannel divider for extracting subchannels allocated to each mobile station from the OFDM symbols that have undergone the FFT process; a symbol timing estimator for estimating a time delay between a timing of each OFDM symbol received from the mobile station and a reference symbol timing of the base station; a delay time phase compensator for compensating for phase distortions of the OFDM symbols of the mobile stations of the subchannels extracted by the subchannel group divider by using the delay time estimated by the symbol timing estimator; and a channel estimation and equalizer for performing distortion correction of the OFDM symbols of the mobile stations of the subchannels compensated by the delay time phase compensator, the distortion correction being performed according to an amplitude and a phase resulting from a signal channel of the mobile station.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
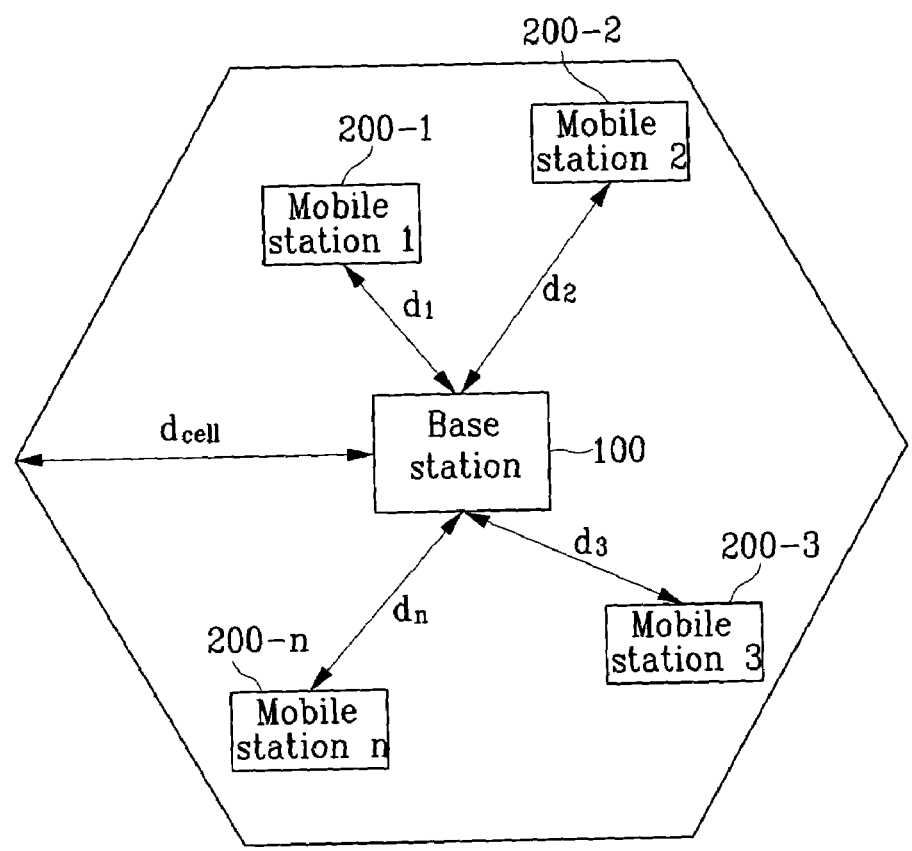
FIG. 1 shows a block diagram of a reverse link in an OFDMA-based cellular system.

FIG. 1 shows a block diagram of a reverse link in an OFDMA-based cellular system.

Referring to FIG. 1, n mobile stations 200-1 through 200-n in an OFDMA-based cellular system are respectively required to have delay times of $d_1, d_2, \ldots, d_n$ with respect to a transmit symbol timing of the base station 100 in order to transmit data to the base station 100 through a reverse link.

The transmit timing of the mobile stations 200-1 through 200-n and of the base station 100 have the relation as described below.

Figure 2:
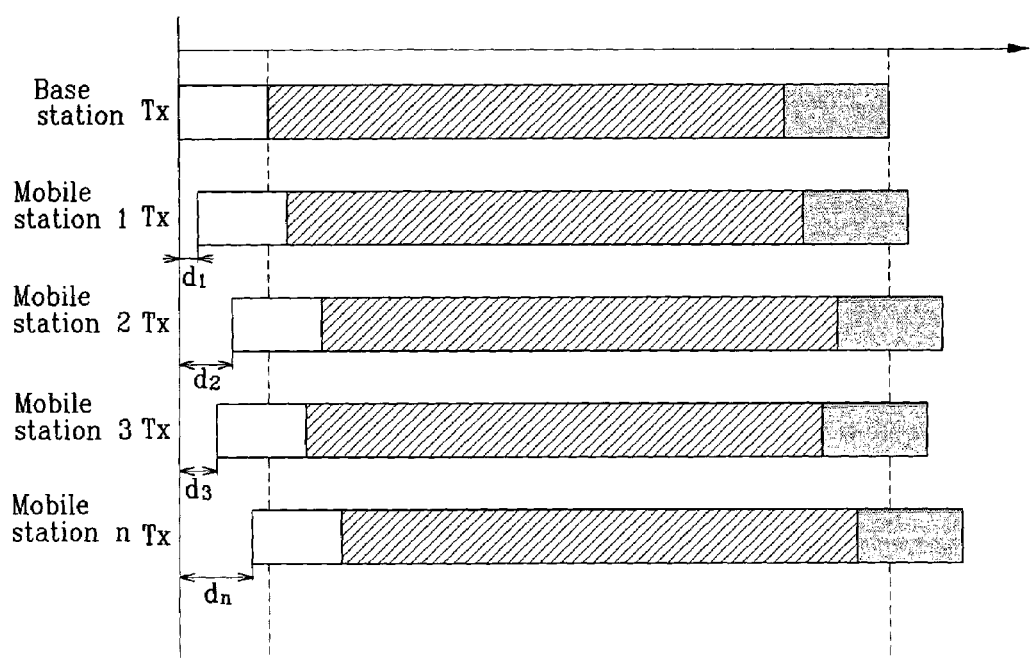
FIG. 2 shows transmit timing signals received at a base station connected to mobile stations of FIG. 1, and shows also transmit timing signals of the base station.

FIG. 2 shows transmit timing signals received at a base station connected to mobile stations of FIG. 1, and shows also transmit timing signals of the base station.

Referring to FIG. 2, if it is assumed that a receiver of the base station 100 has acquired a symbol timing of the first mobile station 200-1, symbol timing errors between the mobile stations 200-2 through 200-n and the mobile station 200-1 are generated even though the receiver of the base station 100 synchronizes its own timing with respect to the symbol timing received from the first mobile station 200-1. Therefore, the data of other mobile stations are distorted, and overall performance deterioration occurs because of the distortion.

The degree of interference is described below.

Figure 3:
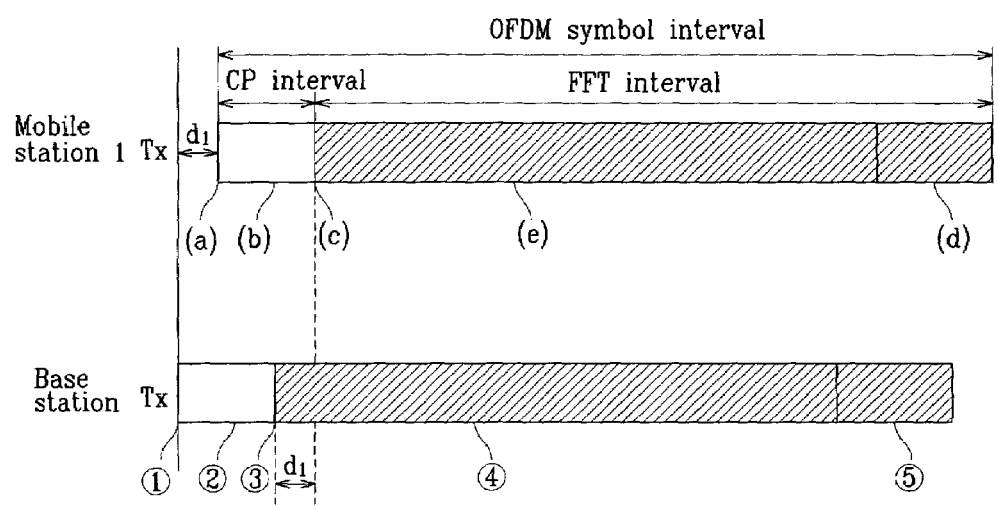
FIG. 3 shows an OFDM symbol configuration, and a relation between a transmit timing signal of a base station and a transmit timing signal of a mobile station.

FIG. 3 shows an OFDM symbol configuration, and a relation between a transmit timing signal of a base station and a transmit timing signal of a mobile station.

In particular, FIG. 3 shows an OFDM symbol configuration between a receiver of the base station 100 and the first mobile station 200-1 that initially acquires the symbol timing.

The receiver of the base station 100 accurately estimates a starting point (a) of the OFDM symbol of the first mobile station 200-1 so as to successfully demodulate a signal of the first mobile station 200-1, and adds a pre-established symbol guard interval (b) (referred to as a CP, or cyclic prefix hereinafter) to the estimated starting point (a) to find an FFT starting point (c).

When the receiver of the base station 100 performs an FFT process on the data in an FFT interval (d) beginning from the found FFT starting point (c) to extract data allocated to a subchannel of the corresponding first mobile station 200-1, the result is that the signal of the first mobile station 200-1 is successfully demodulated.

If, instead of using the symbol timing of the first mobile station 200-1, the reference timing ① of the base station 100 is regarded as a symbol sync of the first mobile station 200-1 to demodulate the same, the characteristics of distortions caused by timing errors are altered according to the delay time $d_1$ of the first mobile station 200-1. When the symbol timing of the first mobile station 200-1 is actually provided in the CP (② of FIG. 3), it is influenced by Equation 1.

$$Y_{l,k} = X_{l,k} H_{l,k} e^{-j2\pi k d_1/N} + W_{l,k} \qquad \text{Equation 1}$$

where $Y_{l,k}$ is a demodulation signal, $H_{l,k}$ is a transmit signal, $W_{l,k}$ is a multipath fading channel of the k-th subcarrier of the l-th OFDM symbol in the frequency domain, and N is a size of the FFT.

When the symbol timing of the mobile station is outside the CP ②, phase distortion, and subcarrier interference and ISI (inter symbol interference) allocated to other mobile stations are generated at the demodulated data as given in Equation 2.

$$Y_{l,k} = e^{j2\pi \epsilon k/N} \alpha(\epsilon) X_{l,k} H_{l,k} + n_{l,k,\epsilon} + W_{l,k} \qquad \text{Equation 2}$$

where $\epsilon$ is a relative delay time between the base station reference timing and the mobile station, $n_{l,k,\epsilon}$ is an interference between the ISI and inter subcarrier interference, and $$\alpha(\epsilon) = \sum_i |h_i(t)|^2 \frac{N - \epsilon_i}{N}$$

is an attenuation term of a symbol. Therefore, symbol timing errors of each of the mobile stations 200-1 through 200-n may occur in the CP ② or the FFT intervals ④ and ⑤, and accordingly, different distortions occur.

An OFDMA-based cellular system for preventing distortions will now be described.

Figure 4:
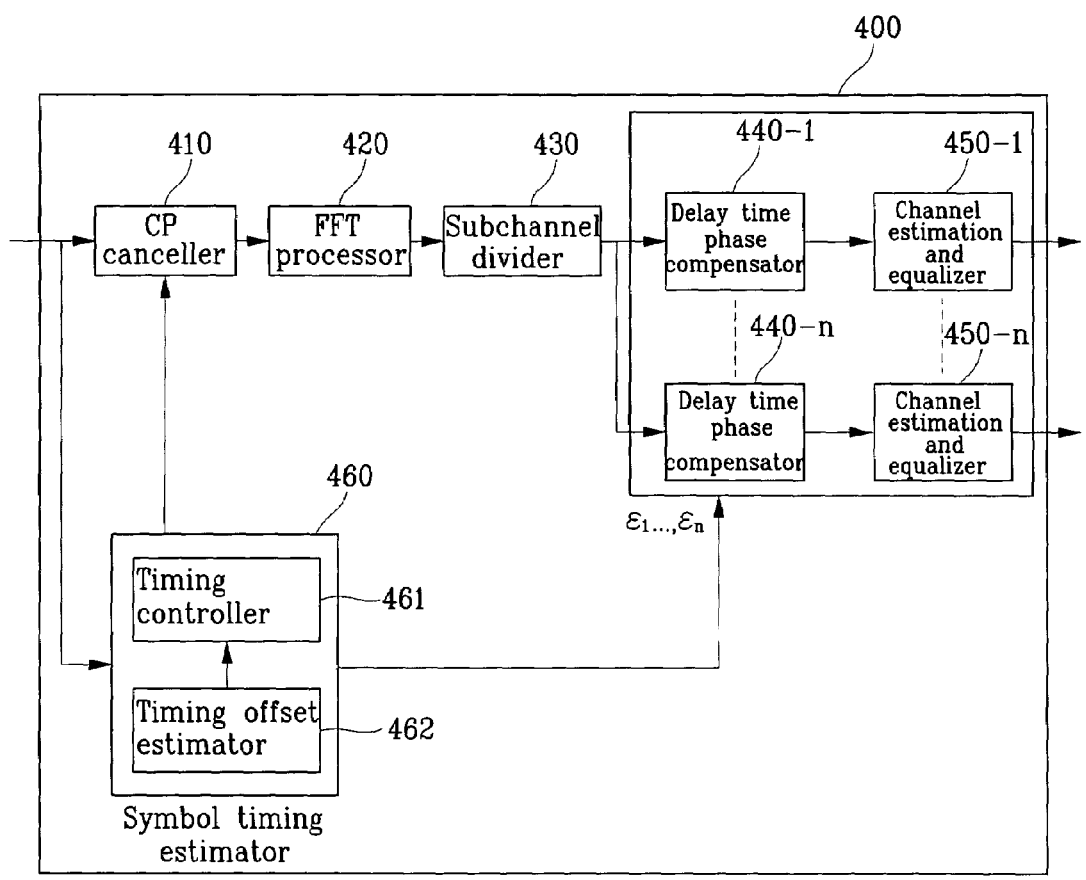
FIG. 4 shows a block diagram of a phase distortion compensator in a base station of an OFDMA-based cellular system according to a preferred embodiment of the present invention.

FIG. 4 shows a block diagram of a phase distortion compensator in a base station of an OFDMA-based cellular system according to a preferred embodiment of the present invention.

Referring to FIG. 4, the phase distortion compensator 400 of the base station 100 of the OFDMA-based cellular system comprises a CP canceller 410, an FFT processor 420, a subchannel divider 430, delay time phase compensators 440-1 through 440-n, channel estimation and equalizers 450-1 through 450-n, and a symbol timing estimator 460. The phase distortion compensator 400 is a device provided in the receiver of the base station 100, with a plurality of phase distortion compensators 400 being provided therein for each of the mobile stations 200-1 through 200-n. For illustration purposes, only one of the phase distortion compensators 400 is shown in the drawing.

The symbol timing estimator 460 comprises a timing controller 461 and a timing offset estimator 462.

The phase distortion compensator 400 performs phase distortion compensation of the OFDM symbol received from the mobile stations 200-1 through 200-n. The receiver of the base station 100 processes the signal compensated by the phase distortion compensator 400.

The CP canceller 410 cancels a CP (b) of the OFDM symbol provided from all the mobile stations 200-1 through 200-n and received at the base station 100, and the FFT processor 420 demodulates the CP-cancelled OFDM symbol for all the subchannels.

The subchannel divider 430 divides the signal demodulated by the FFT processor 420 into respective mobile station data by using a specific tone which is used by each mobile station 200-1 through 200-n for data modulation.

The timing offset estimator 462 of the symbol timing estimator 460 estimates delay times of base station transmit symbol timings of the mobile stations 200-1 through 200-n, and groups together the mobile stations with distributed delay times for a predetermined duration of time. The timing controller 461 generates a first reference time $R_1$ by using a symbol timing of the mobile station with the shortest delay in the group, and converts delay times of the mobile stations belonging to the group into relative delay times $\epsilon_1$ through $\epsilon_n$ by using the reference time $R_1$ in the calculation of the relative delay times $\epsilon_1$ through $\epsilon_n$. That is, the relative delay times $\epsilon_1$ through $\epsilon_n$ are found using Equation 3.

$$\epsilon_i = d_i - R_1 \quad \text{Equation 3}$$

where $\epsilon_i$ is a relative delay time of the i-th mobile station and $d_i$ is a time delay of the i-th mobile station.

The phase distortion compensator 400 demodulates a signal received from the mobile stations 200-1 through 200-n based on the base station reference time $R_1$. Distortion of the demodulation data caused by the symbol timing errors of the mobile stations 200-1 through 200-n belonging to each of the groups generates phase errors as given in Equation 1. This will now be described in detail.

Referring to FIG. 3, the symbol starting point (a) of the first mobile station 200-1 is delayed by $\epsilon_1$ beginning at the base station OFDM symbol start ①. Therefore, when the base station reference time $R_1$ is established based on the mobile station with the shortest delay time of the first group, the timing errors of all the mobile stations belonging to the corresponding group are generated in the CP. Accordingly, signals of the mobile stations 200-1 through 200-n have a phase distortion corresponding only to a difference between the base station transmit symbol timing and the symbol timings of the mobile stations 200-1 through 200n as evident from Equation 1. The result of this is that the phase distortion on the respective subchannels belonging to the mobile stations 200-1 through 200-n can be accurately restored if the relative delay times $\epsilon_1$ through $\epsilon_n$ can be accurately estimated.

The symbol timing estimator 460 performs grouping of all the mobile stations 200-1 through 200-n within a cell as described above, and generates a base station reference timing and a relative delay time for the phase distortion compensator 400 so that the phase distortion compensator 400 may perform accurate phase distortion compensation.

In addition, the symbol timing estimator 460 estimates relative delay times of each of the mobile stations 200-1 through 200-n by applying specific modulated codes to preambles of the mobile stations 200-1 through 200-n.

The delay time phase compensators 440-1 through 440-n restore a distorted phase of the data of the corresponding mobile station according to the relative delay time estimated by the symbol timing estimator 460. Restoration is performed as shown in Equation 4 by a degree corresponding to the level of phase distortion indicated in Equation 1.

Equation 4

$$\hat{X}_{l,k} = Y_{l,k} e^{j2\pi k \delta_1 / N}$$

The channel estimation and equalizers 450-1 through 450-n perform channel estimation on the restored data signals of each of the mobile stations 200-1 through 200-n, and equalizes channel-estimated signals to thereby normally process the signals.

According to the above-described method, since the receiver of the base station requires no additional synchronization process between the mobile stations 200-1 through 200-n by the phase distortion compensator 400 and dynamically operates according to delay time distributions of the mobile stations within the cell, the design of the receiver need not be complicated.

A sync distortion compensation method in the OFDMA-based cellular system according to the preferred embodiment of the present invention will now be described.

Figure 5:
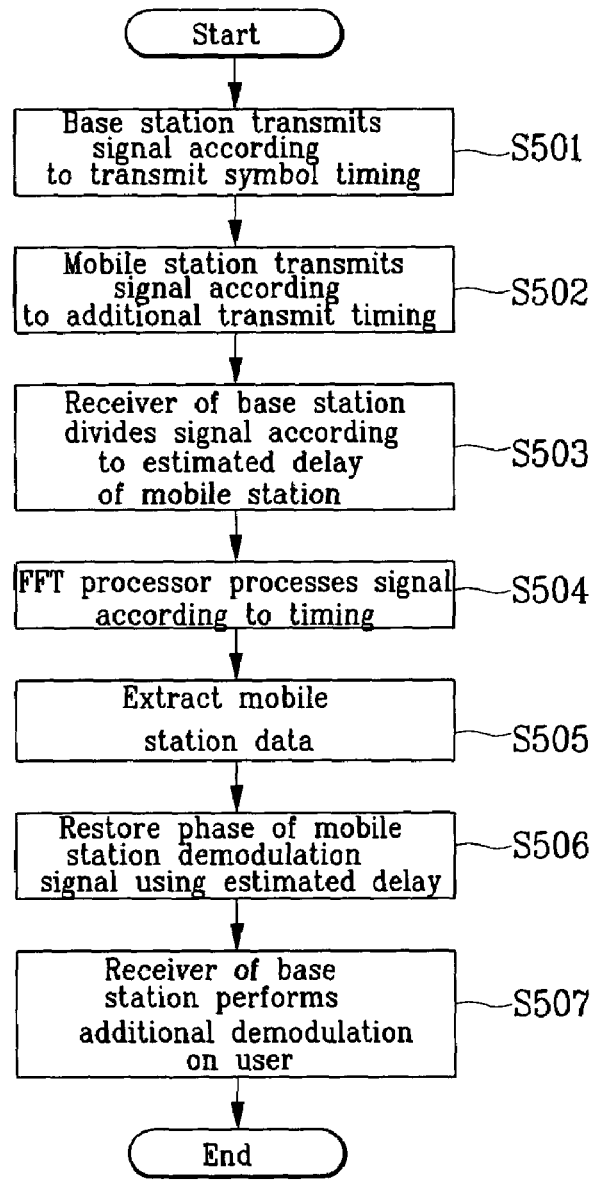
FIG. 5 shows an operational flowchart for a phase distortion compensation method in a base station of an OFDMA-based cellular system according to a preferred embodiment of the present invention.

FIG. 5 shows an operational flowchart for a phase distortion compensation method in a base station of the OFDMA-based cellular system according to a preferred embodiment of the present invention.

Referring to FIG. 5, the base station 100 transmits a signal according to an established transmit symbol timing in step S501. The mobile stations 200-1 through 200-n then acquire transmit symbol timings delayed by a predetermined time from the base station 100, and transmit data to the receiver of the base station 100 by applying each of the transmit symbol timings through the reverse link in step S502. The OFDM symbols from the mobile stations 200-1 through 200-n received at the receiver of the base station 100 have their phase distortion compensated for through the phase distortion compensator 400 of the receiver of the base station 100, and the receiver of the base station 100 processes residual data of the signal that has undergone phase distortion compensation.

The symbol timing estimator 460 of the base station 100 estimates a delay time of each mobile station, groups together the mobile stations that are provided within a given time interval, and calculates a reference timing signal for each group and a relative delay with respect to the reference timing in step S503.

The CP controller 410 of the phase distortion compensator 400 cancels a CP of the OFDM symbol received from the mobile stations 200-1 through 200-n according to the reference timing signal of the base station 100 obtained in step S503, and the FFT processor 420 performs an FFT process on the CP-cancelled OFDM symbol from the mobile stations 200-1 through 200-n in step S504. Therefore, without performing any precise control of the symbol timing of the mobile stations 200-1 through 200-n, the phase distortion compensator 400 is able to perform FFT processes on the OFDM symbol received through the reverse link from the mobile stations 200-1 through 200-n according to a receive symbol timing of the base station 100.

The subchannel divider 430 divides the OFDM symbol that has undergone FFT processing in step S504 into subchannel groups of the mobile stations 200-1 through 200-n in step S505. Next, in step S506, the symbol timing estimator 460 measures delay times of the mobile stations 200-1 through 200-n, and the delay time phase compensators 440-1 through 440-n compensate for the phases of the signals of the mobile stations 200-1 through 200-n by using the delay time estimated by the symbol timing estimator 460.

The channel estimation and equalizers 450-1 through 450-n perform an additional demodulation process on the phase-compensated signals of the mobile stations 200-1 through 200-n to thereby complete phase distortion compensation in step S507.

In the additional demodulation process, channel estimation and equalization are performed to reduce residual distortion by adding a pilot for channel estimation of the subchannel groups of each of the mobile stations 200-1 through 200-n.

As described above, the phase distortion compensation device and method in a base station of the OFDMA-based cellular system requires no additional synchronization between mobile stations in a multi-user environment and in the reverse link of the OFDMA, and demodulates the data between multi-users without the use of a complicated design of the base station receiver. Further, the present invention can be applied to a system for synchronization between the mobile stations.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method for compensating for phase distortions in a base station of an OFDMA (orthogonal frequency division multiple access) based cellular system, comprising:
    (a) receiving OFDM (orthogonal frequency division multiplexing) symbols from a plurality of mobile stations;
    (b) grouping the plurality of the mobile stations according to a predetermined duration of time, and generating a reference timing signal for each group and relative delay times among the mobile stations;
    (c) canceling a symbol guard interval using the reference timing signal, and performing an FFT (fast Fourier transform) process on the OFDM symbols;
    (d) dividing the OFDM symbols that have undergone FFT processing into subchannel groups of the mobile stations;
    (d) restoring phases of the OFDM symbols divided into subchannel groups based on the estimation of the relative delay times among the mobile stations; and
    (e) performing channel estimation and equalization on the restored OFDM symbols for each mobile station to thereby perform a demodulation process.

2. The method of claim 1, wherein as to the reference timing signal, predetermined mobile stations with delay times shorter than a predetermined time are formed into the group, and the reference timing signal for decoding mobile station signals of this group is generated.

3. The method of claim 2, wherein the reference timing signal is obtained based on the delay time of one of the mobile stations with the shortest delay time within the group.

4. The method of claim 1, wherein the FFT process in (a) is performed according to a reference symbol timing of the base station.

5. The method of claim 1, wherein in (e), the phase distorted OFDM symbols of the mobile stations are restored by the relative delay times calculated based on a difference between a delay time of the base station and a reference time resulting from the reference timing signal.

6. The method of claim 1, wherein (f) comprises performing channel estimation and equalization to reduce residual distortions.

7. In a device for compensating for phase distortion of OFDM symbols received from a plurality of mobile stations in a base station of an OFDMA (orthogonal frequency division multiple access) based cellular system, a phase distortion compensator in the base station of the OFDMA-based cellular system, comprising:
    a symbol guard interval canceller for canceling a symbol guard interval of the OFDM symbols of the plurality of mobile stations received at the base station, the symbol guard interval canceller to cancel the symbol guard time using a reference time;
    an FFT (fast Fourier transform) processor for performing an FFT process on the OFDM symbols with the cancelled symbol guard interval;
    a subchannel divider for extracting subchannels allocated to each mobile station from the OFDM symbols that have undergone the FFT process;
    a symbol timing estimator for grouping the plurality of the mobile stations according to a predetermined duration of time, and generating the reference timing signal for each group and estimating the relative delay times among the OFDM symbols received from the mobile stations;
    a delay time phase compensator for compensating for phase distortions of the OFDM symbols of the mobile stations of the subchannels extracted by the subchannel group divider by using the relative delay times estimated by the symbol timing estimator; and
    a channel estimation and equalizer for performing distortion correction of the OFDM symbols of the mobile stations of the subchannels compensated by the delay time phase compensator, the distortion correction being performed according to an amplitude and a phase resulting from a signal channel of the mobile station.

8. The device of claim 7, wherein the symbol timing estimator further comprises:
    a timing offset estimator for estimating delay times of the mobile stations with respect to a transmit symbol timing of the base station; and
    a timing controller for grouping together the mobile stations according to the delay times of the mobile stations estimated by the timing offset estimator, obtaining the reference time using a symbol timing of the mobile station with the shortest delay time in each group, and obtaining the relative delay times by using the reference time.

* * * * *